(12) United States Patent
Shoemaker, Jr.

(10) Patent No.: US 11,266,261 B1
(45) Date of Patent: Mar. 8, 2022

(54) UTILITY HOOK ASSEMBLY WITH HIDDEN MAGNETIC LATCH

(71) Applicant: Stephen P. Shoemaker Trust, Manhattan Beach, CA (US)

(72) Inventor: Stephen P. Shoemaker, Jr., Redondo Beach, CA (US)

(73) Assignee: Stephen P. Shoemaker Trust, Manhattan Beach, CA (US)

( * ) Notice: Subject to any disclaimer, the term of this patent is extended or adjusted under 35 U.S.C. 154(b) by 0 days.

(21) Appl. No.: 17/392,174

(22) Filed: Aug. 2, 2021

(51) Int. Cl.
*A47G 29/08* (2006.01)
*A47B 77/10* (2006.01)
*F16B 45/00* (2006.01)

(52) U.S. Cl.
CPC .............. *A47G 29/08* (2013.01); *A47B 77/10* (2013.01); *F16B 45/00* (2013.01)

(58) Field of Classification Search
CPC ...... A47G 29/08; A47G 29/083; A47G 77/10; F16B 45/00; Y10S 248/914
USPC ......................................... 248/914; 223/120
See application file for complete search history.

(56) References Cited

U.S. PATENT DOCUMENTS

| D281,221 S | * | 11/1985 | Edmiston | A47J 45/02 |
| | | | | D8/356 |
| D486,379 S | * | 2/2004 | Olson | D8/370 |
| 9,427,113 B2 | * | 8/2016 | Rinck | A47J 45/02 |
| 10,889,249 B1 | * | 1/2021 | Snyder | A47F 5/0006 |
| 2005/0194334 A1 | * | 9/2005 | Johnson | A45D 8/36 |
| | | | | 211/85.2 |
| 2006/0214074 A1 | * | 9/2006 | Daoud | A47G 29/083 |
| | | | | 248/304 |

* cited by examiner

Primary Examiner — Anita M King
(74) Attorney, Agent, or Firm — Fulwider Patton LLP

(57) ABSTRACT

A utility hook assembly is disclosed that conveniently secures to a planar surface such as the bottom of a counter or cabinet, and has a plurality of hooks that extend perpendicular to a mounting base. The base may be half of a hinge plate with a plurality of eyelets that are collinear at an edge of the hinge plate. The eyelets each receive one of two L-shaped rods with an upturned, outwardly formed tip that cooperate to serve as hooks such that the hooks can swing/pivot about the eyelets. The legs are separated by a metallic spacer that maintains the integrity of the rods. A magnet is mounted proximal to the hinge plate in a position that intersects the arc traveled by the spacer when the hooks are fully rotated parallel to the horizontal plane. The magnet captures the spacer, which in turn allows the hooks to be hidden when not in use.

3 Claims, 4 Drawing Sheets

UTILITY HOOK ASSEMBLY WITH HIDDEN MAGNETIC LATCH

BACKGROUND

The present invention relates generally to utility hooks, and more particularly to a utility hook assembly that mounts below a horizontal surface so that a pair of hooks can be suspended therefrom and when not in use, conveniently stored with a mounted magnet.

Utility hooks are well known in the art. Wallboard may include holes that receive hooks for hanging items, and there are many other examples of hooks used in kitchens, work areas, closets, and many retail locations like bars, restaurants, etc., where space is at a premium. While hooks can be hung from a wall or a ceiling, it is sometimes desirable to hide the hooks out of sight when not in use to present a more uncluttered space. There are few good options for having a hook assembly that can be stored out of the way when not in use, but easily deployed for quick and handy use.

SUMMARY OF THE INVENTION

The present invention is a utility hook assembly that conveniently secures below a planar surface such as the bottom of a counter or cabinet, and has a plurality of hooks that extend perpendicular to a mounting hinge. The hinge includes fastener holes that can be used to mount the hinge to the underside of a surface found in a kitchen, counter, shop, shed, studio, laundry room, office, or any location where space is limited. The hinge includes a plurality of eyelets that are collinear along an edge, where the eyelets are sized to receive and secure a rod so that the rod can rotate within the eyelets. The hooks are formed by a pair of L-shaped rods each having a segment that is mounted in the eyelets for rotation therein, and each L-shaped rod is formed at a free end with an upwardly, outwardly angled tip that serves as catch to hang items. The hooks can swing/pivot about the eyelets a full one hundred and eighty degrees. The legs of the are connected by a metal spacer such as a thin bar or plate that can be welded to each leg, where the spacer allows the legs to remain parallel with weighted objects hung on the angled tips, and prevents bending or warping of the legs. The spacer ensures that the legs remain in the eyelets of the hinge plate and because it is metallic, it can serve as the connection point to the magnet. The spacer provides a point of attachment to the horizontal surface by virtue of a magnet mounted on the surface in the arc path of the spacer, allowing the magnet to capture the hook assembly at the spacer plate to hide the hooks when not in use. The magnet may be in a preferred embodiment a Neodymium permanent magnet selected for their small size and strong magnetic field. The magnets allow the hooks to attach to the legs at the metallic spacer without any other mechanical attachments, providing a simple and reliable attachment mode for the hook assembly.

These and other features of the invention will best be understood with reference to the drawings and the detailed description of the invention.

DETAILED DESCRIPTION OF THE PREFERRED EMBODIMENTS

Figure 1:
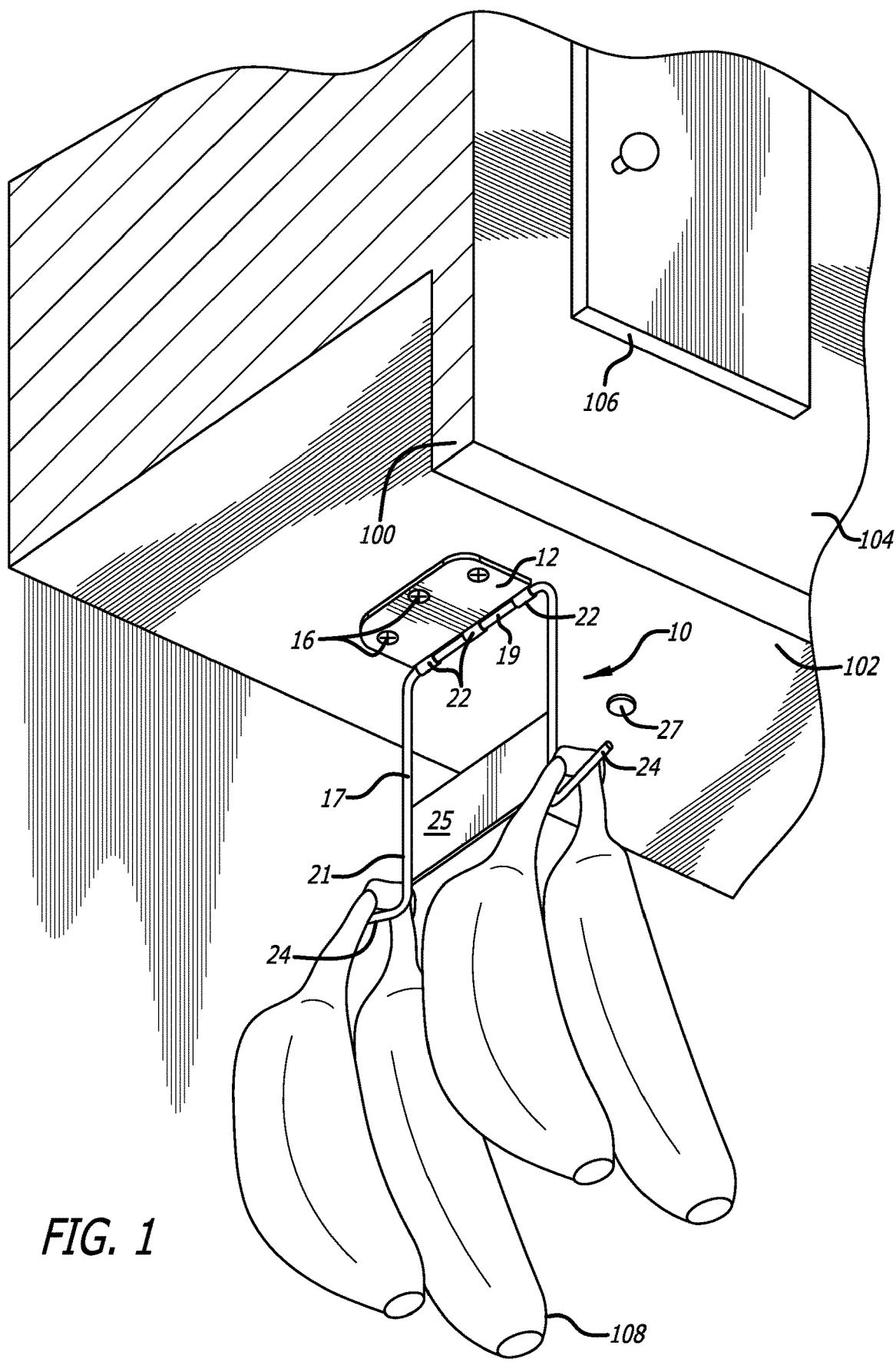
FIG. 1 is a perspective of a first embodiment of the invention.
Figure 2:
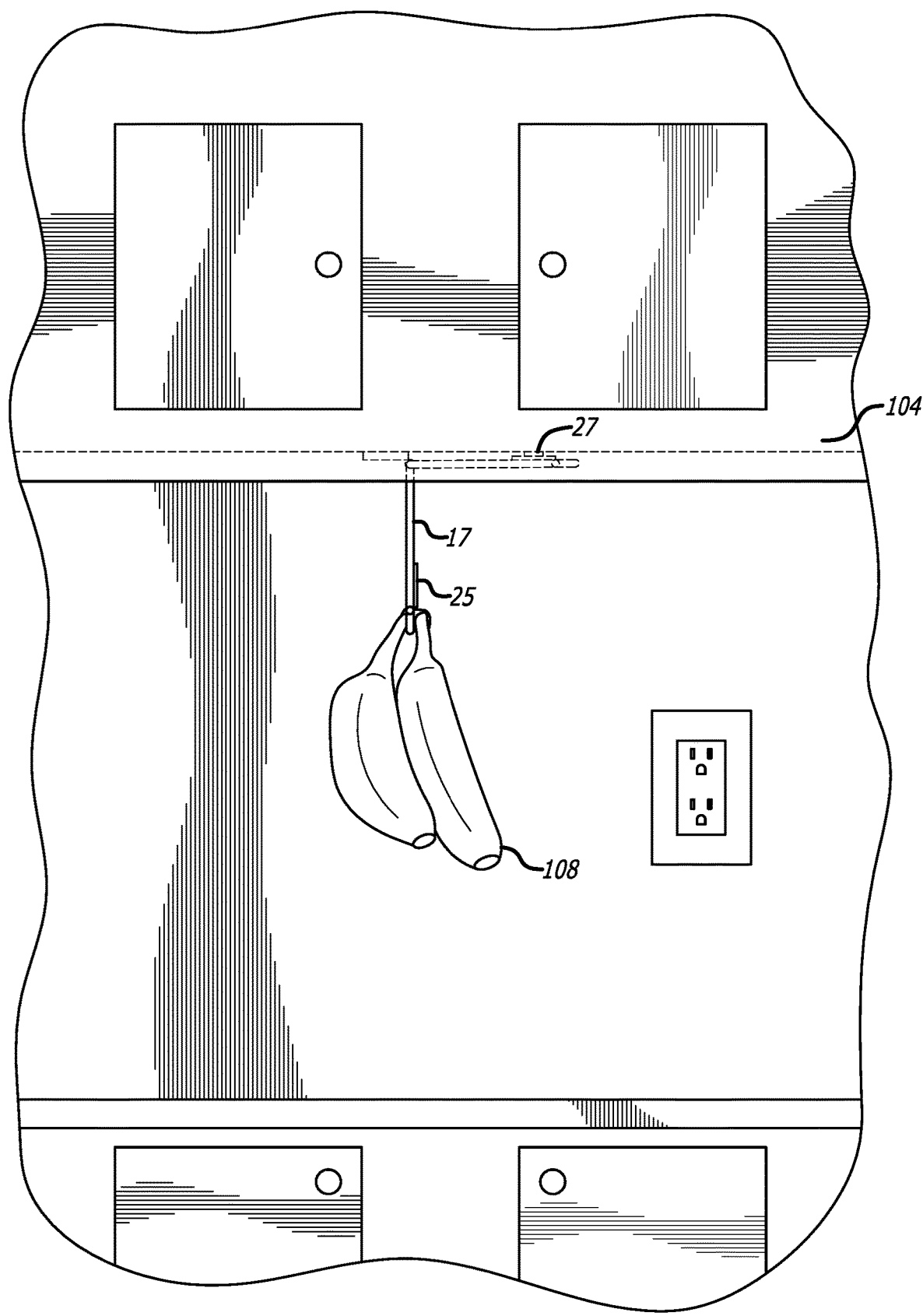
FIG. 2 is a side view, partially in phantom, of the embodiment of FIG. 1.
Figure 3:
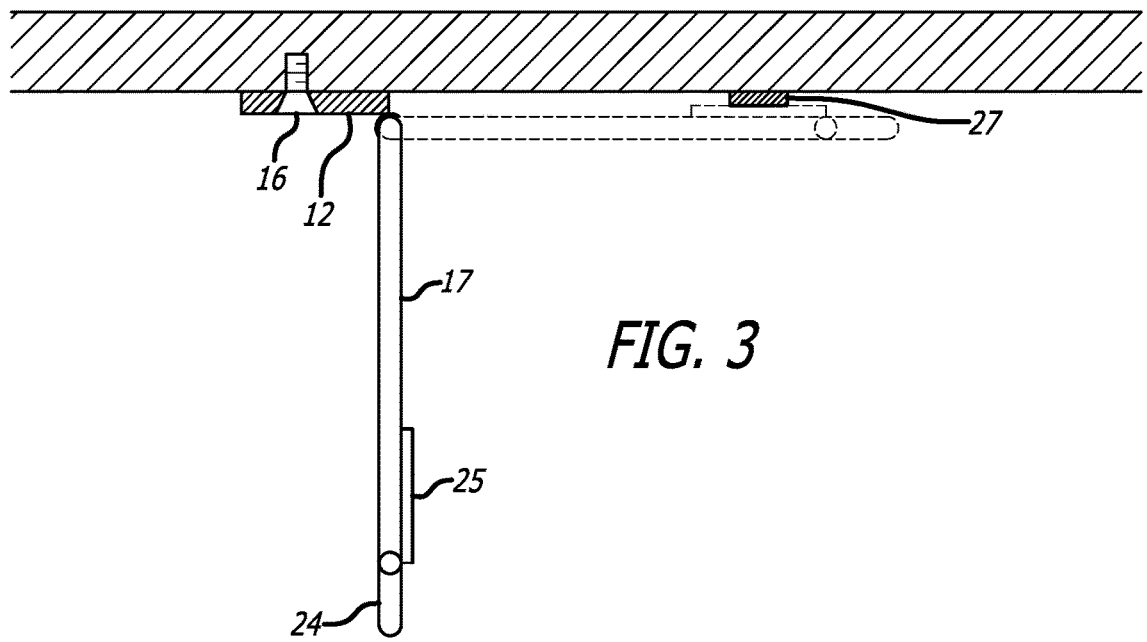
FIG. 3 is an enlarged side view, partially in phantom, of the embodiment of FIG. 1.
Figure 4:
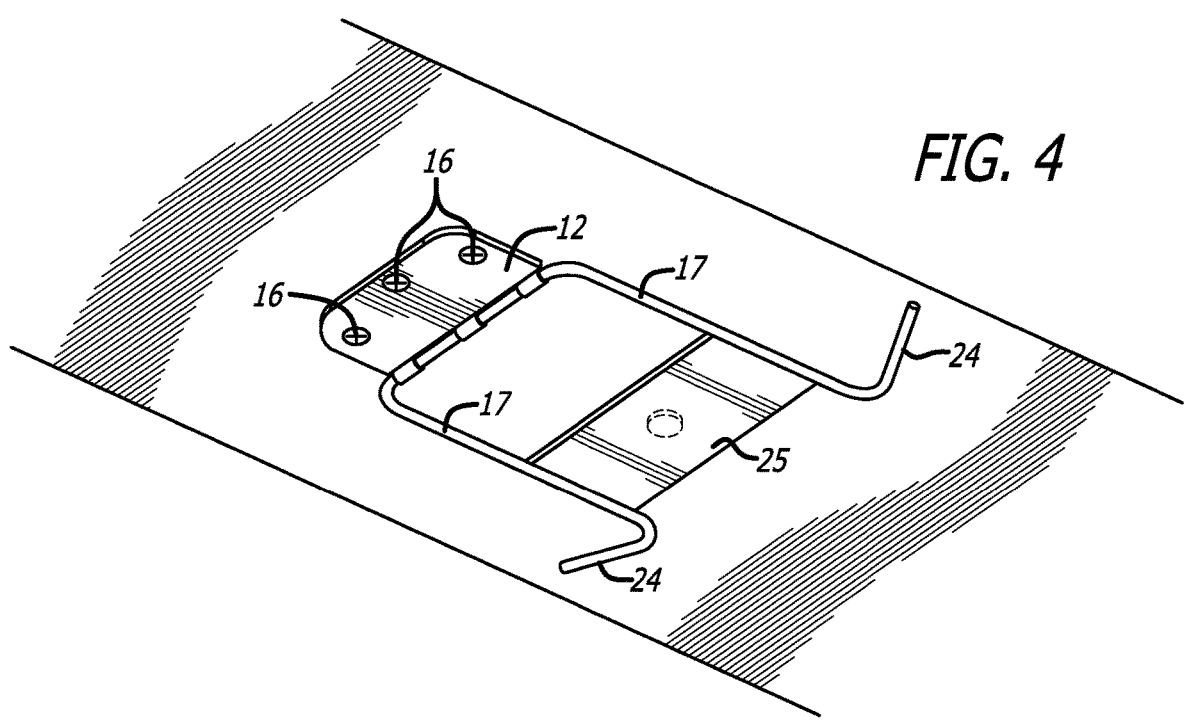
FIG. 4 is an upward perspective view of the embodiment of FIG. 1.
Figure 5:
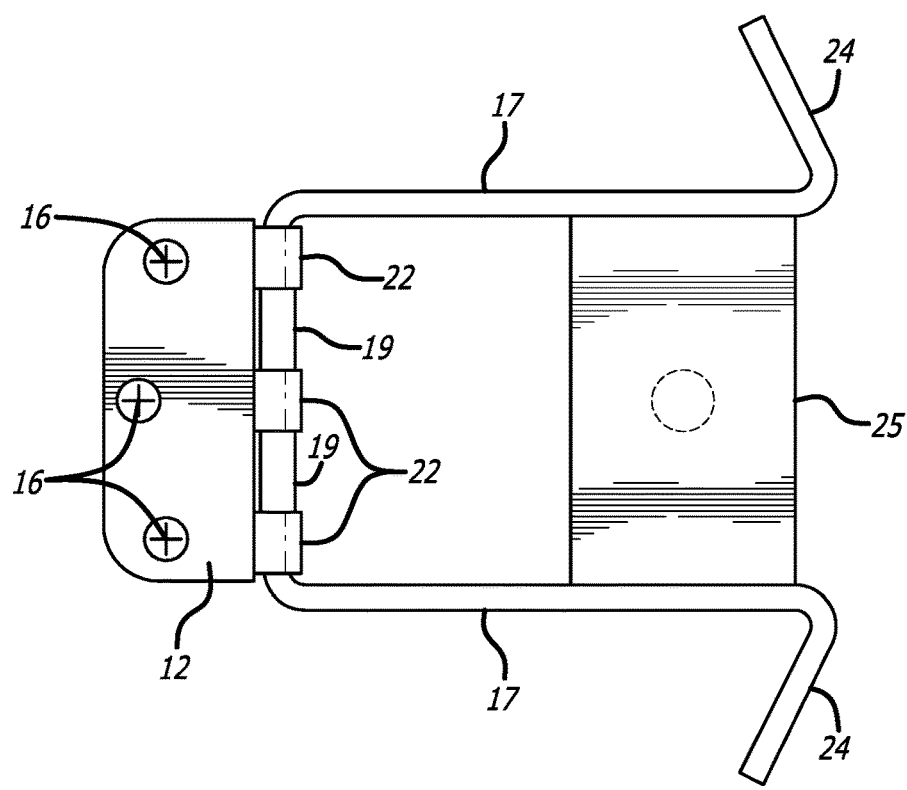
FIG. 5 is a bottom view of the embodiment with both hooks stored.
Figure 6:
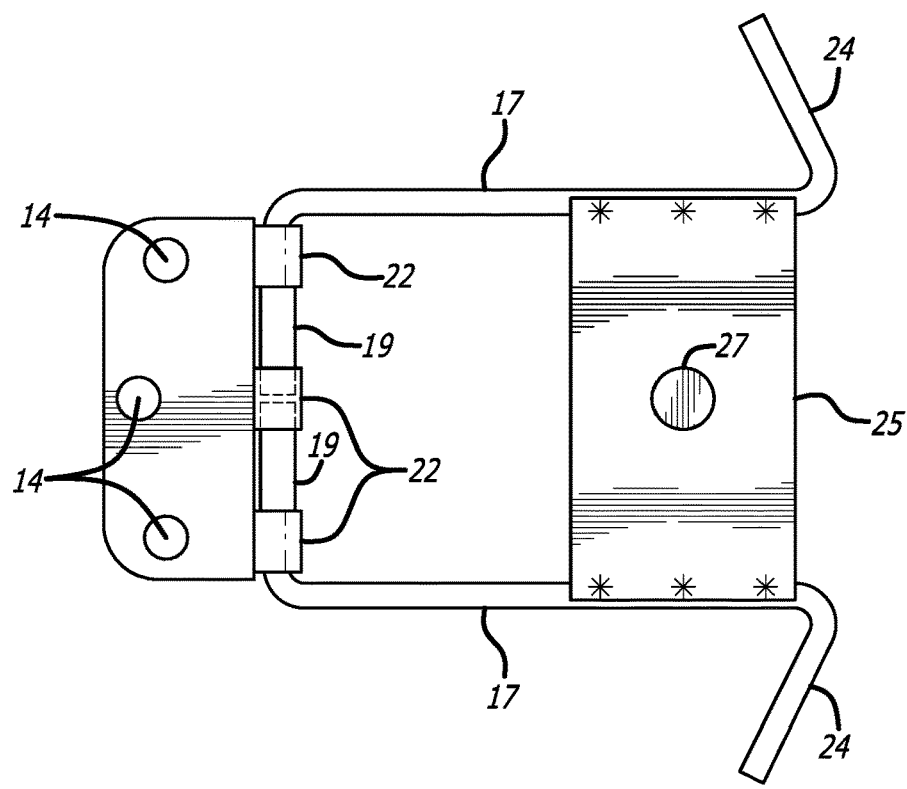
FIG. 6 is a top view of the embodiment of FIG. 1

A first embodiment of the present invention is shown in FIGS. 1-6 in the environment of an underside of a kitchen cabinet 100. It is to be understood that the invention has many uses and many applications, and is not limited by the particular environment shown in the Figures. The kitchen cabinet 100 has an underside 102 below a front facing panel 104 and a cabinet door 106. Only a portion of the cabinet 100 is shown for clarity. The invention is shown hanging a pair of bananas 108, although they could easily be used for potholders, kitchen utensils, tools, headsets, items to dry, or a myriad of other items.

Mounted to the underside 102 of the cabinet 100 is a utility hook assembly, generally denoted 10. The assembly 10 includes a plate 12 that can be formed of one half of an ordinary door hinge, and the plate 12 includes fastener holes 14 and fasteners 16 for affixing the assembly 10 to the underside 102 of the cabinet 100. The plate 12 is preferably formed with multiple eyelets 22 along a common edge so as to share a common longitudinal axis.

The assembly 10 further comprises two L-shaped rods 17 each having a base 19 and an extension 21. The bases 19 are captured by the eyelets 22 so that each extension can rotate about the plate 12. The extensions 21 are also formed with a free end that bend into a hook 24 that can be used to hang various items such as the bananas 108 as shown in FIG. 1.

Between the first and second extensions 21 is a support plate 25 that extends between the extensions and is attached to each extension near the free ends. The support plate 25 can be metal and welded to the extensions 21 to form a rigid attachment. The plate 25 stiffens the extensions 21 and prevents the legs from bending or buckling when carrying a heavier object, and also serves to keep the bases 19 solidly in the eyelets 22. Further, the plate 25 is preferably metallic and allows the hook assembly to be easily stored by connection to a magnet mounted to a horizontal surface.

Disposed on the surface 102 of the cabinet is a small magnet 27 that is positioned to intersect the arc traveled by the support plate 25 as the extensions 21 swing about the eyelets 22 of the hinge plate 12. When so positioned, the magnet captures the plate 25 and holds the L-shaped rods against the surface 102 below the cabinet 100, hidden from view. When not in use, the assembly 10 attaches via the magnet 27, and when needed the plate is detached from the magnet 27 and the rod is permitted to dangle vertically to allow items to be hung conveniently on the hooks.

The present invention has been depicted and described with respect to the inventor's preferred embodiment, but the invention is not limited to those embodiments shown and described herein. A person of ordinary skill in the art will readily recognize that there are many variations, modifications, and substitutions that are possible with the present invention, and the scope of the invention is intended to include all such variations, modifications, and substitutions. Accordingly, unless expressly limited herein, the scope of the invention is properly measured by the words of the appended claims using their customary and ordinary meanings consistent with, but not limited to, the embodiments described and depicted above.

I claim:

1. A utility hook assembly, comprising:
a plate including holes for receiving a fastener therethrough and a plurality of cylindrical eyelets mounted on a first edge and sharing a common longitudinal axis;
a pair of rods configured into first and second L-shapes members each forming a separate leg, each leg including an outwardly, upwardly angled end adapted to provide one of first and second hooks, the rods pivotally supported in the cylindrical eyelets for rotation thereabout;
a metallic spacer member fixed between the first and second legs and spaced from the cylindrical eyelets, the metallic spacer member rigidly connected to the first and second legs; and
a magnet mounted proximal to the plate at an intersection with an arc traveled by the metallic spacer member when the hooks are rotated about the cylindrical eyelets;
wherein the magnet attaches the metallic spacer to position the first and second hooks horizontally, and wherein the first and second hooks dangle vertically from their respective eyelets when the metallic spacer is not attached to the magnet.

2. The utility hook assembly of claim 1, wherein the metallic spacer member is welded to the rods.

3. The utility hook assembly of claim 2, wherein the metallic spacer member is rectangular.

* * * * *